United States Patent
Chuang et al.

(10) Patent No.: US 10,914,540 B1
(45) Date of Patent: Feb. 9, 2021

(54) WATER COOLING SYSTEM FOR PROVIDING WATER WITH CONSTANT TEMPERATURE

(71) Applicants: Yung-Yu Chuang, Taichung (TW); Yung-Cheng Chuang, Taichung (TW); Cheng-Wei Lin, Taichung (TW)

(72) Inventors: Yung-Yu Chuang, Taichung (TW); Yung-Cheng Chuang, Taichung (TW); Cheng-Wei Lin, Taichung (TW)

(73) Assignee: Yung-Cheng Chuang

( * ) Notice: Subject to any disclaimer, the term of this patent is extended or adjusted under 35 U.S.C. 154(b) by 0 days.

(21) Appl. No.: 16/554,625

(22) Filed: Aug. 29, 2019

(51) Int. Cl.
*F28F 27/02* (2006.01)
*F28D 21/00* (2006.01)

(52) U.S. Cl.
CPC ...... *F28F 27/02* (2013.01); *F28D 2021/0077* (2013.01)

(58) Field of Classification Search
CPC ........... F28D 9/0093; F28D 2021/0077; F28F 27/00; F28F 27/02
See application file for complete search history.

(56) References Cited

U.S. PATENT DOCUMENTS

| | | | | |
|---|---|---|---|---|
| 3,480,076 A | * | 11/1969 | Tomita | G05D 23/1931 165/254 |
| 3,888,303 A | * | 6/1975 | Skala | A47J 27/17 165/300 |
| 4,769,998 A | * | 9/1988 | Oswalt | F25B 41/04 62/185 |
| 5,974,817 A | * | 11/1999 | Prummer | B41F 7/24 101/487 |
| 6,422,310 B2 | * | 7/2002 | Egara | F25D 17/02 165/108 |
| 2001/0037652 A1 | * | 11/2001 | Sasayama | F25D 31/005 62/201 |
| 2002/0007932 A1 | * | 1/2002 | Egara | F28F 27/00 165/41 |

* cited by examiner

*Primary Examiner* — Eric S Ruppert

(57) ABSTRACT

A water cooling system includes a temperature control device which is connected with a first heat exchanger. A second heat exchanger includes a water temperature control path and a constant temperature water path. The water of the first heat exchanger is controlled by the temperature control device and flows to the water temperature control path. The water in the constant temperature water path tows through the second heat exchanger to proceed heat exchange with the water in the water temperature control path, and then flows to the target equipment. The temperature difference of the water flowing to the target equipment is smaller than that of conventional water cooling system.

6 Claims, 3 Drawing Sheets

WATER COOLING SYSTEM FOR PROVIDING WATER WITH CONSTANT TEMPERATURE

BACKGROUND OF THE INVENTION

1. Fields of the Invention

The present invention relates to a water cooling system, and more particularly, to a water temperature cooling system using two heat exchangers to provide water with constant temperature to cool target equipment.

2. Descriptions of Related Art

Cooling processes are important for most of the industrial production plants such as to cool plastic products or wafers. It is experienced that the change of temperature of the water for cooling the products may affect shrinkage of the products. In order to control the temperature of the water for cooling the products, a temperature control system 300 is developed as shown in FIG. 3, and the temperature control system 300 includes a temperature control device 400 and a heat exchanger 500 which includes a hot water path 800, a refrigerant path 600 and an even temperature water path 700. The temperature control device 400 controls the operation of the hot water path 800, the refrigerant path 600 and the heat exchanger 500 to keep the water temperature of the even temperature water path 700 to be close to the desired temperature. The water in the even temperature water path 700 flows to the target equipment 900 to cool the product. The water then flows from the target equipment 900 to the even temperature water path 700 to form a water circulation. The water in the even temperature water path 700 flows through the heat exchanger 500, the hot water path 800 and the refrigerant path 600 to reduce severe temperature change to the water, such that the temperature difference of the water from the even temperature water path 700 to the target equipment 900 does not change too much. However, the conventional water cooling system cannot meet specific needs for cooling wafers.

The present invention intends to provide a water cooling system which provides water of constant temperature to target equipment.

SUMMARY OF THE INVENTION

The present invention relates to a water cooling system and comprises a temperature control device and a first heat exchanger. The first heat exchanger includes a hot water path, a refrigerant path and an even temperature water path. Two ends of the hot water path are respectively connected to the temperature control device, and two ends of the refrigerant path are respectively connected to the temperature control device as well. The even temperature water path includes an even temperature water outlet and an even temperature water inlet. A first pump is connected between a first tank and the even temperature water inlet. A second heat exchanger includes a water temperature control path and a constant temperature water path. The water temperature control path includes a first inlet and a first outlet. The first inlet is connected to the even temperature water outlet. The first outlet is connected to the first tank. The constant temperature water path includes a constant temperature water outlet and a constant temperature water inlet. A target equipment is connected between the constant temperature water outlet and a second tank. A second pump is connected between the second tank and the constant temperature water inlet.

The temperature control device controls the temperature of the refrigerant path and the even temperature water path, therefore, the water in the even temperature water path reaches a pre-set temperature via the first heat exchanger, the hot water path and the refrigerant path. The water in the even temperature water path flows through the water temperature control path and enters into the first tank. The first pump pumps the water in the first tank to the even temperature water path to form a circulation. The second pump pumps the water in the second tank to the constant temperature water path, and the water in the constant temperature water path flows through the second heat exchanger to proceed heat exchange with the water in the water temperature control path so that the water from the constant temperature water path keeps the pre-set temperature and flows to the target equipment. The water in the target equipment then flows back to the second tank.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
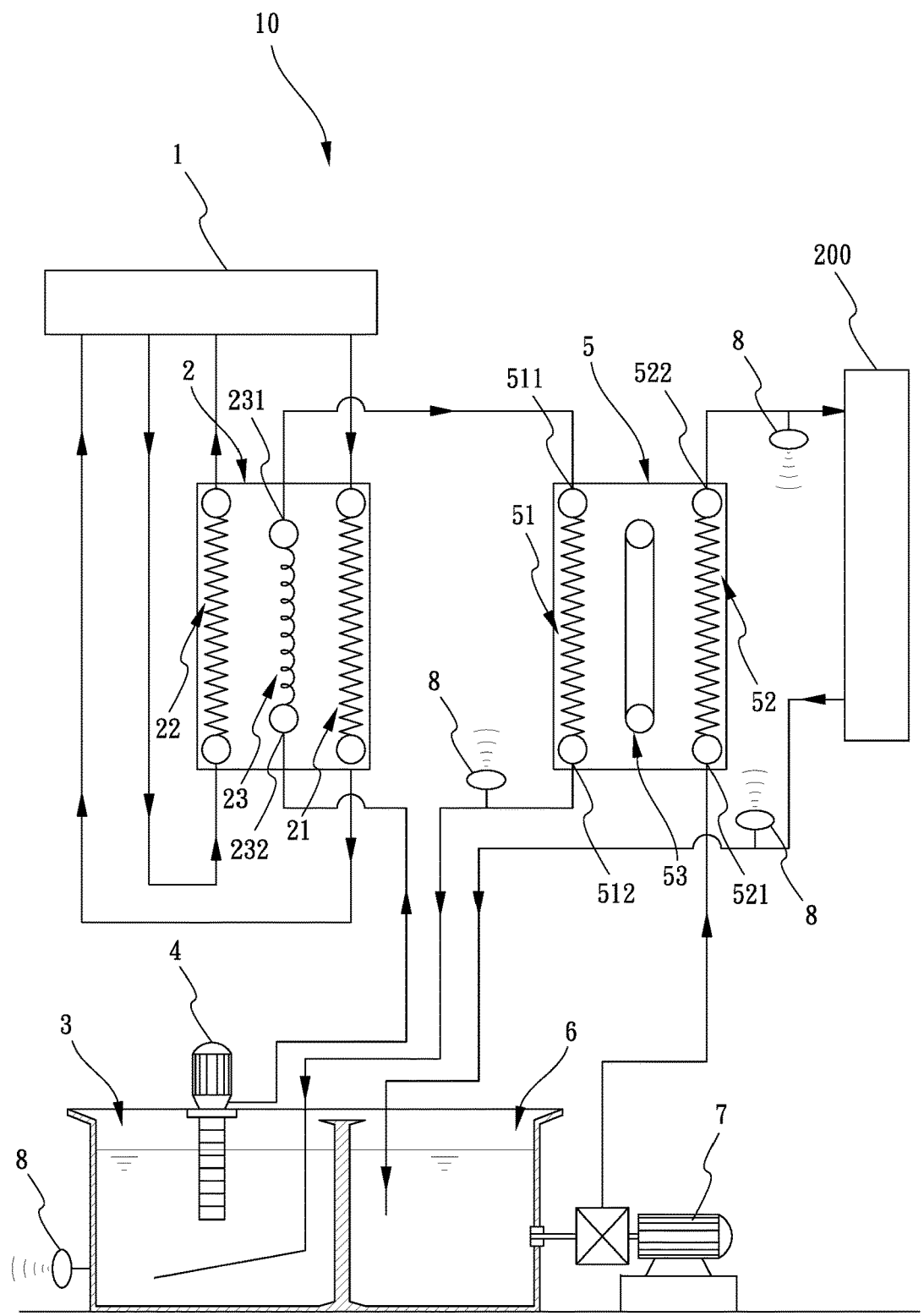
FIG. 1 shows the water cooling system of the present invention.

Referring to FIG. 1, the water cooling system 10 of the present invention comprises a temperature control device 1, a first heat exchanger 2, a first tank 3, a first pump 4, a second heat exchanger 5, a second tank 6, and a second pump 7. The first heat exchanger 2 includes a hot water path 21, a refrigerant path 22 and an even temperature water path 23. The two ends of the hot water path 21 are respectively connected to the temperature control device 1, and the two ends of the refrigerant path 22 are respectively connected to the temperature control device 1 as well. The even temperature water path 23 includes an even temperature water outlet 231 and an even temperature water inlet 232. The first pump 4 is connected between the first tank 3 and the even temperature water inlet 232 so as to pump the water in the first tank 3. The second heat exchanger 5 includes a water temperature control path 51 and a constant temperature water path 52. The water temperature control path 51 includes a first inlet 511 and a first outlet 512. The first inlet 511 is connected to the even temperature water outlet 231, and the first outlet 512 is connected to the first tank 3. The constant temperature water path 52 includes a constant temperature water outlet 522 and a constant temperature water inlet 521. A target equipment 200 is connected between the constant temperature water outlet 522 and the second tank 6. The second pump 7 is connected between the second tank 6 and the constant temperature water inlet 521 so as to pump the water in the second tank 6.

When the water cooling system 10 operates, the temperature control device 1 controls the temperature of the refrigerant path 22 and the even temperature water path 23 so that the water in the even temperature water path 23 reaches a pre-set temperature via the first heat exchanger 2, the hot water path 21 and the refrigerant path 22. The water in the even temperature water path 23 flows through the water temperature control path 51 and enters into the first tank 3. The first pump 4 pumps the water in the first tank 3 to the even temperature water path 23 to form a circulation.

The second pump 7 pumps the water in the second tank 6 to the constant temperature water path 52, and the water in the constant temperature water path 52 flows through the second heat exchanger 5 to proceed heat exchange with the water in the water temperature control path 51 so that the water from the constant temperature water path 52 keeps the pre-set temperature and flows to the target equipment 200. The water in the target equipment 200 then flows back to the second tank 6. There are multiple temperature sensors 8 installed to the even temperature water outlet 231, the first outlet 512, the constant temperature water outlet 522, a position of the target equipment 200 where water leaves from the target equipment 200, and the first tank 3. The temperature control device 1 judges the water temperature by these multiple temperature sensors 8 so as to control the hot water path 21 and the refrigerant path 22. The multiple temperature sensors 8 send signals back to the temperature control device 1 by way of wireless transmission or cable transmission. The temperature control device 1 can also include condensation unit, compressor, heater and hot pump to control the hot water path 21 and the refrigerant path 22.

The water temperature is stable by using the first heat exchanger 2 to proceed heat exchange to the water in the hot water path 21 and the refrigerant path 22. The water in the constant temperature water path 52 flows through the second heat exchanger 5 to proceed heat exchange with the water in the water temperature control path 51 so that the water from the constant temperature water path 52 keeps the pre-set temperature and flows to the target equipment 200. That is to say, the water that flows to the target equipment 200 is proceeded by two times of heat exchange so that the temperature of the water to the target equipment is more stable than that of the conventional water cooling system. The water temperature proceeded by the conventional water cooling system can be controlled within a range of positive 0.1 to minus 0.1 degrees Celsius. The water temperature proceeded by the water cooling system 10 of the present invention can be controlled within a range of positive 0.05 to minus 0.05 degrees Celsius.

Figure 2:
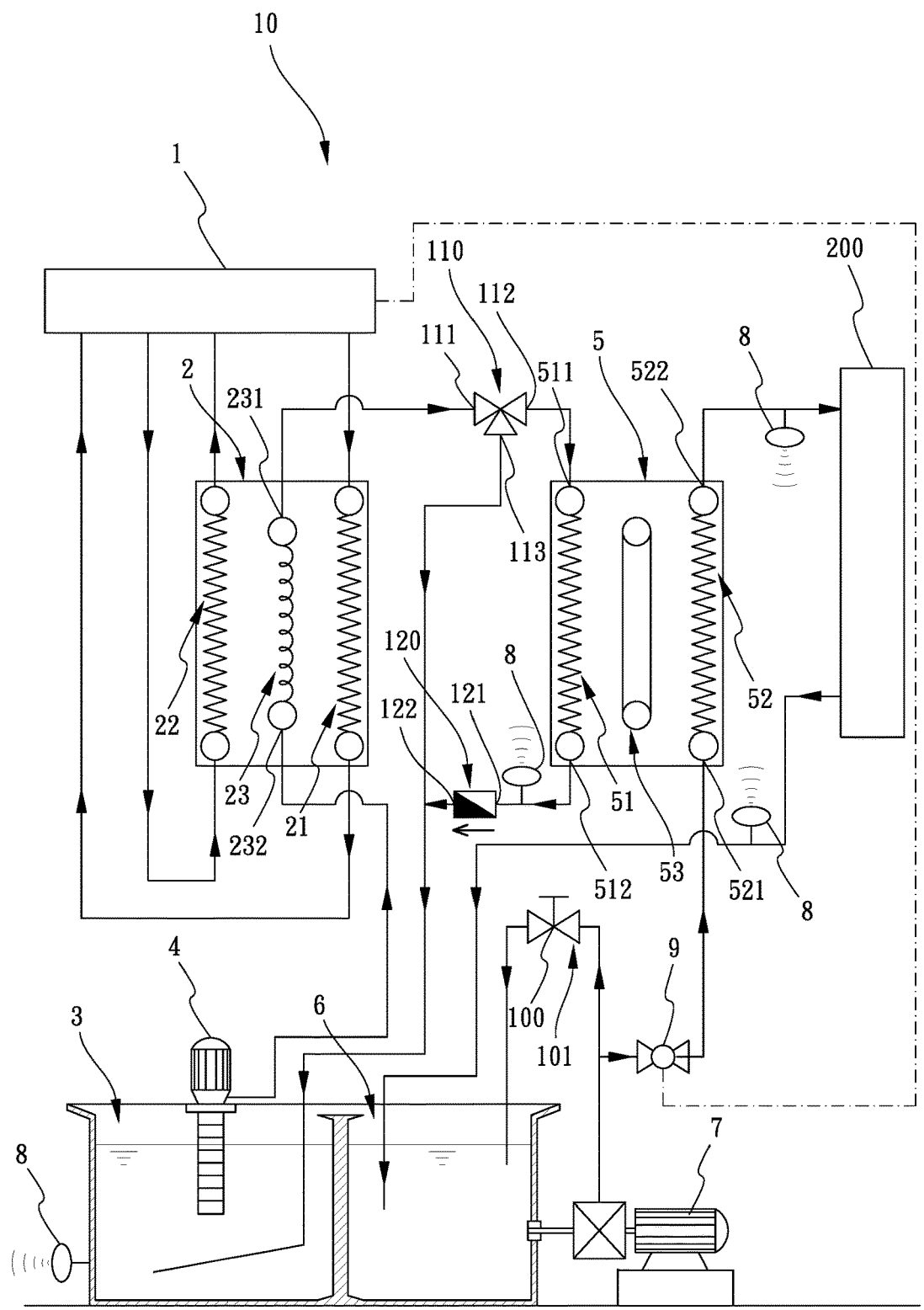
FIG. 2 shows another embodiment of the water cooling system of the present invention.
Figure 3:
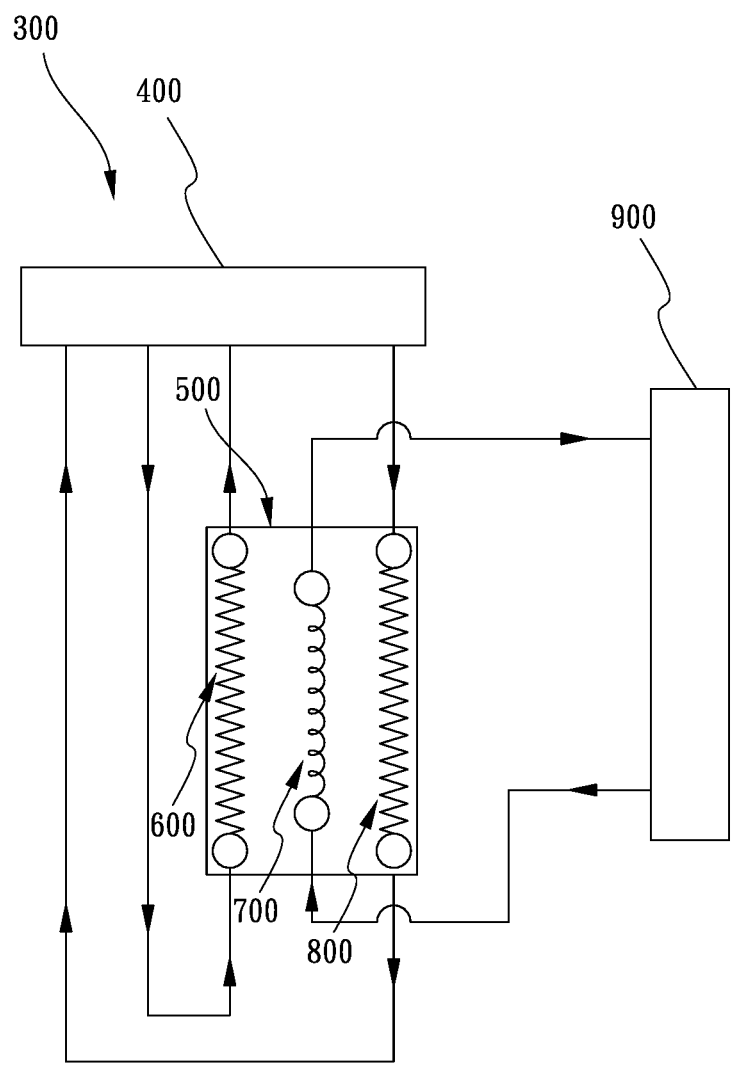
FIG. 3 shows the conventional water cooling system.

As shown in FIG. 2, a switch 9 is connected between the constant temperature water inlet 521 and the second pump 7. The switch 9 checks water flowing through the switch 9 and sends a signal to the temperature control device 1 to confirm that the second pump 7 pumps water to the constant temperature water path 52. By this way, the operation between the second pump 7 and the constant temperature water path 52 can be monitored, for example, the second pump 7 fails to operate or the second pump is stocked. The communication between the switch 9 and the temperature control device 1 can be cabled or wireless. A release valve 100 is connected between the second pump 7 and the second tank 6 to form a release path 101. When the second pump 7 pumps the water in the second tank 6 to the constant temperature water path 52, a portion of the water pumped by the second pump 7 flows back to the second tank 6 by the settings or the release valve 100 so as to control water pressure of the water from the second pump 7 to the constant temperature water path 52. Another portion of the water pumped by the second pump 7 flows to the switch 9. This is able to control the water pressure of the water that flows from the second pump 7 to the constant temperature water path 52, and to control the water pressure of the water that flows from constant temperature water path 52 to the target equipment 200. By this arrangement, the second heat exchanger 5 and the target equipment 200 are protected from being damaged by high pressure.

Besides, the second heat exchanger 5 includes a reservoir 53 which is filled with heat-conductive agent (not shown) and vacuumed. By this arrangement, the efficiency of the second heat exchanger 5 is improved. The heat-conductive agent can be refrigerant or water.

The water cooling system 10 further comprises a three-way valve 110 and a check valve 20. The three-way valve 110 includes a valve inlet 111, a valve first outlet 112 and a valve second outlet 113. The valve inlet 111 is connected with the even temperature water outlet 231. The valve first outlet 112 is connected with the first inlet 511 of the water temperature control path 51. The valve second outlet 113 is connected with the first tank 3. The check valve 120 includes an entrance 121 and an exit 122, wherein the entrance 121 is connected with the first outlet 512 of the water temperature control path 51, and the exit 122 is connected with the first tank 3. The three-way valve 110 controls water volume from the even temperature water outlet 231 to the first inlet 511 of the water temperature control path 51 according to settings of the temperature control device 1. Therefore, for a portion of the water that does not flow to the first inlet 511, the three-way valve 110 controls water volume from the valve second outlet 113 to the first tank 3 so that water cannot flows from the exit 122 to the entrance 121 of the check valve 120. The three-way valve 110 is able to control the water volume to the water temperature control path 51 so that the temperature difference of the water to the target equipment 200 is further minimized. The check valve 120 prevents the water from the valve second outlet 113 from flowing back to first outlet 512 of the water temperature control path 51 to affect the water temperature to the target equipment 200. The temperature control device 1 controls the three-way valve 110 by the signals feedback from the temperature sensors 8, for example, the temperature sensor 8 of the first tank 3 sends signals of water temperature back to the temperature control device 1. The temperature sensor 8 may be installed at the first outlet 512 of the water temperature control path 51, and the temperature sensor 8 is located between the first outlet 512 of the water temperature control path 51 and the entrance 121 of the check valve 120.

While we have shown and described the embodiment in accordance with the present invention, it should be clear to those skilled in the art that further embodiments may be made without departing from the scope of the present invention.

What is claimed is:
1. A water cooling system comprising:
   a temperature controller;
   a first heat exchanger having a hot water path, a refrigerant path and an even temperature water path, two ends of the hot water path respectively connected to the temperature controller, two ends of the refrigerant path respectively connected to the temperature controller, the even temperature water path including an even temperature water outlet and an even temperature water inlet;
   a first tank;
   a first pump connected between the first tank and the even temperature water inlet;
   a second heat exchanger including a water temperature control path and a constant temperature water path, the water temperature control path including a first inlet and a first outlet, the first inlet connected to the even temperature water outlet, the first outlet connected to the first tank, the constant temperature water path including a constant temperature water outlet and a constant temperature water inlet;

a second tank;

a target equipment connected between the constant temperature water outlet and the second tank;

a second pump connected between the second tank and the constant temperature water inlet;

wherein the temperature controller controls temperature of the refrigerant path and the even temperature water path, water in the even temperature water path reaches a pre-set temperature via the first heat exchanger, the hot water path and the refrigerant path, water in the even temperature water path flows through the water temperature control path and enters into the first tank, the first pump pumps the water in fir the tank to the even temperature water path to form a circulation, the second pump pumps water in the second tank to the constant temperature water path, the water in the constant temperature water path flows through the second heat exchanger to proceed heat exchange with the water in the water temperature control path so that the water from the constant temperature water path keeps the pre-set temperature and flows to the target equipment, water in the target equipment flows back to the second tank.

2. The water cooling system as claimed in claim 1, wherein a switch is connected between the constant temperature water inlet and the second pump, the switch checks water flowing through the switch and sends a signal to the temperature controller to confirm that the second pump pumps water to the constant temperature water path.

3. The water cooling system as claimed in claim 1, wherein a release valve is connected between the second pump and the second tank to form a release path, when the second pump pumps the water in the second tank to the constant temperature water path, a portion of the water pumped by the second pump flows back to the second tank by the release valve so as to control water pressure of the water from the second pump to the constant temperature water path.

4. The water cooling system as claimed in claim 2, wherein a release valve is connected between the second pump and the second tank to form a release path, when the second pump pumps the water in the second tank to the constant temperature water path, a portion of the water pumped by the second pump flows back to the second tank by the release valve, another portion of the water pumped by the second pump flows to the switch so as to control water pressure of the water from the second pump to the constant temperature water path.

5. The water cooling system as claimed in claim 1 further comprising a three-way valve and a check valve, the three-way valve including a valve inlet, a valve first outlet and a valve second outlet, the valve inlet connected with the even temperature water outlet, the valve first outlet connected with the first inlet of the water temperature control path, the valve second outlet connected with the first tank, the check valve including an entrance and an exit, the entrance connected with the first outlet of the water temperature control path, the exit connected with the first tank, the three-way valve controlling water volume from the even temperature water outlet to the first inlet of the water temperature control path, the three-way valve controlling water volume from the valve second outlet to the first tank so that water cannot flows from the exit to the entrance of the check valve.

6. The water cooling system as claimed in claim 5, wherein the second heat exchanger includes a reservoir which is filled with a heat-conductive agent and vacuumed.

\* \* \* \* \*